United States Patent
Lee et al.

(10) Patent No.: US 10,903,702 B2
(45) Date of Patent: Jan. 26, 2021

(54) MOTOR INCLUDING ROTOR CORE AND PLATE SUPPORTING MAGNET

(71) Applicants: Hyundai Motor Company, Seoul (KR); Kia Motors Corporation, Seoul (KR)

(72) Inventors: Jungwoo Lee, Gyeonggi-do (KR); WoongChan Chae, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 309 days.

(21) Appl. No.: 15/962,292

(22) Filed: Apr. 25, 2018

(65) Prior Publication Data
US 2019/0173341 A1    Jun. 6, 2019

(30) Foreign Application Priority Data
Dec. 2, 2017    (KR) ......................... 10-2017-0164696

(51) Int. Cl.
*H02K 1/27*     (2006.01)
*H02K 15/12*    (2006.01)
*H02K 15/03*    (2006.01)

(52) U.S. Cl.
CPC ........... *H02K 1/2766* (2013.01); *H02K 15/03* (2013.01); *H02K 15/12* (2013.01)

(58) Field of Classification Search
CPC ........ H02K 1/27; H02K 15/03; H02K 1/2766; H02K 15/12
See application file for complete search history.

(56) References Cited

U.S. PATENT DOCUMENTS

| | | | |
|---|---|---|---|
| 5,581,140 A * | 12/1996 | Futami | H02K 1/276 310/156.53 |
| 9,369,013 B2 * | 6/2016 | Jang | H02K 1/27 |
| 2007/0145849 A1* | 6/2007 | Okamoto | H02K 1/276 310/156.53 |
| 2009/0295245 A1* | 12/2009 | Abe | H02K 1/2793 310/156.35 |
| 2012/0324719 A1* | 12/2012 | Sasaki | B29C 39/10 29/598 |
| 2013/0187506 A1* | 7/2013 | Lee | H02K 1/278 310/156.12 |
| 2014/0042861 A1* | 2/2014 | Kawaji | H02K 1/276 310/156.53 |
| 2016/0294234 A1* | 10/2016 | Oh | H02K 15/03 |

* cited by examiner

*Primary Examiner* — Naishadh N Desai
(74) *Attorney, Agent, or Firm* — Mintz Levin Cohn Ferris Glovsky and Popeo, P.C.; Peter F. Corless

(57) ABSTRACT

A motor having an improved assembly structure of a rotor core and a magnet is provided. The motor comprising a stator and a rotor that rotates with respect to the stator. The rotor comprises a rotor core that is disposed rotatably with respect to a rotary shaft and has a plurality of magnet coupling apertures disposed apart from each other at a particular interval in a circumferential direction of the rotary shaft. Additionally, a magnet is inserted into the magnet coupling aperture and a plate is coupled to opposite end portions of the rotor core. The plate includes a magnet support portion that is configured to support the magnet.

8 Claims, 8 Drawing Sheets

MOTOR INCLUDING ROTOR CORE AND PLATE SUPPORTING MAGNET

CROSS-REFERENCE TO RELATED APPLICATION(S)

This application claims the benefit of Korean Patent Application No. 10-2017-0164696, filed on Dec. 2, 2017 in the Korean Intellectual Property Office, the disclosure of which is incorporated herein by reference.

BACKGROUND

1. Field of the Disclosure

The present disclosure relates to a motor, and more particularly, to a motor that has an improved assembly structure of a rotor core and a magnet.

2. Description of Related Art

A motor is an apparatus that converts electrical energy into mechanical energy to obtain rotational power. Motors are widely used in vehicles, household appliances, and industrial devices. Generally, a motor includes a stator, in which a coil for generating magnetic force by electric power is wound, and a rotor rotatably installed by mutual electromagnetic force with the stator.

The motor is classified into a surface-mounted permanent magnet (SPM) and an interior permanent magnet (IPM) based on the structure of the rotor, that is, based on a position in the rotor in which the permanent magnet is disposed. In other words, in the SPM motor, a permanent magnet is disposed on a surface of a rotor and in the IPM motor, a permanent magnet is disposed inside of a rotor. When the permanent magnet is coupled to the inside of the rotor, a structure for preventing the permanent magnet from being separated from the rotor is provided. The detachment prevention structure of the permanent magnet however, causes magnetic flux leakage and the electromagnetic performance of the motor is reduced as much as an amount of flux leakage.

SUMMARY

Therefore, the present disclosure provides a motor having an improved assembly structure of a rotor core and a magnet. An aspect of the present disclosure provides a motor capable of improving a performance thereof by effectively fixing a magnet assembled to a rotor core, in a more accurate position. Additional aspects of the present disclosure will be set forth in part in the description which follows and, in part, will be obvious from the description, or may be learned by practice of the present disclosure.

In accordance with an aspect of the exemplary embodiments, a motor may include: a stator; and a rotor configured to rotate with respect to the stator. The rotor may include a rotor core disposed rotatably with respect to a rotary shaft and having a plurality of magnet coupling apertures disposed apart from each other at a particular interval in a circumferential direction of the rotary shaft. Additionally, a magnet may be inserted into the magnet coupling aperture and plate may be coupled to opposite end portions of the rotor core, wherein the plate includes a magnet support portion configured to support the magnet.

Further, the magnet support portion may protrude from a bottom surface of the plate. The magnet support portion protrudes from the plate to be coupled between the rotor core and the magnet. The magnet support portion is formed to have a shape that corresponds to at least one portion of the magnet coupling aperture. In particular, the magnet support portion may include a first support portion configured to support a first end surface of the magnet, and a second support portion configured to support a second end surface opposite to the first end surface.

The first support portion may be disposed further to an outside than the second support portion with respect to the center of the plate. The first support portion may include a first support surface in contact with the first end surface, and the second support portion may include a second support surface in contact with the second end surface. The first support portion and the second support portion are accommodated inside of the magnet coupling aperture.

According to another aspect of the present disclosure, a method for manufacturing a rotor may include stacking a rotor core in which a plurality of magnet coupling apertures are disposed; disposing a magnet in the plurality of magnet coupling apertures using a jig from which a magnet support portion protrudes; molding the magnet and the rotor core; and removing the jig and assembling the plate.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
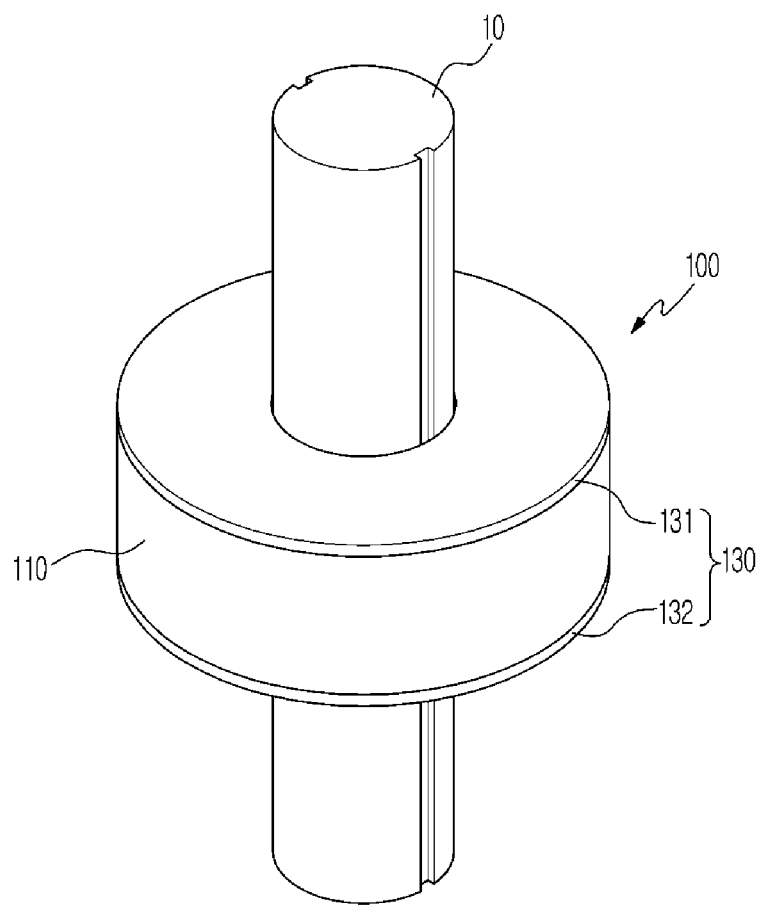
FIG. 1 is view illustrating a rotor of a motor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function. Also, the terms used herein are used to describe the embodiments and are not intended to limit and/or restrict the present disclosure.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. In the following description, the terms of "front end", "rear end", "upper portion", "lower portion", "upper end", "lower end" and the like may be defined by the drawings, but the shape and the location of the component is not limited by the term.

In the following description, a vehicle refers a transportation means for moving an object such as human, object, or animal, from a departure location toward a destination. Vehicles may include vehicles traveling on roads or tracks, ships moving over the sea or river, airplanes flying through the air, etc. In addition, a vehicle driving on a road or a track may move in a predetermined direction according to the rotation of at least one wheel. The vehicle may include a three-wheeled or four-wheeled vehicle, a construction machine, a two-wheeled vehicle, a motor cycle, a bicycle, and a train driving on a rail.

Figure 2:
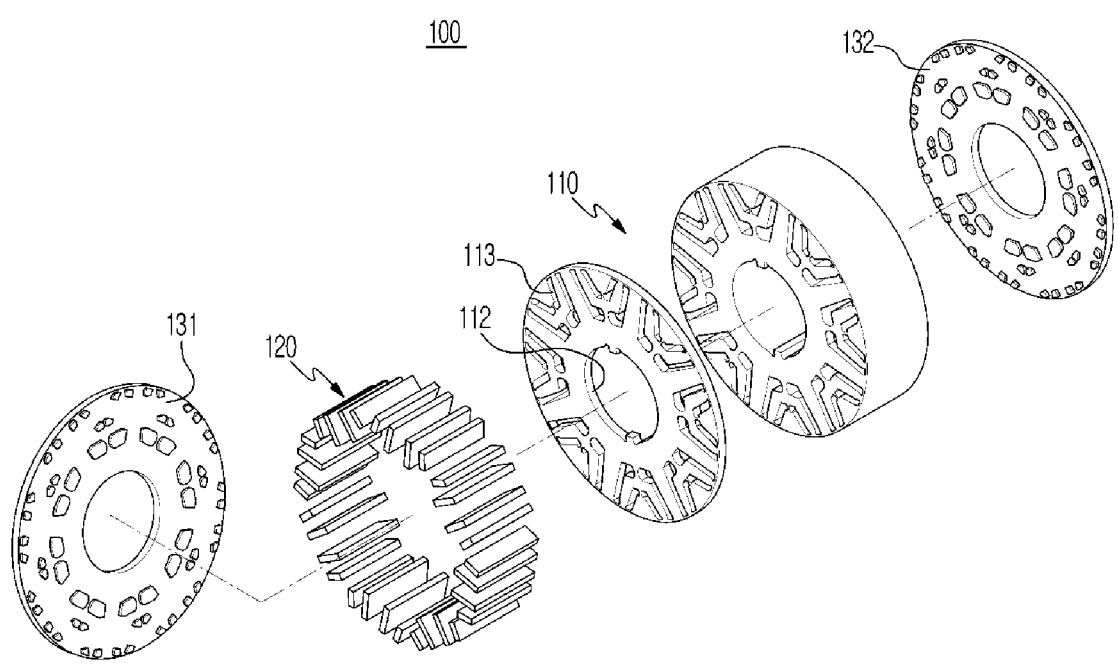
FIG. 2 is a detailed perspective view illustrating the rotor of the motor according to an exemplary embodiment of the present disclosure.
Figure 3:
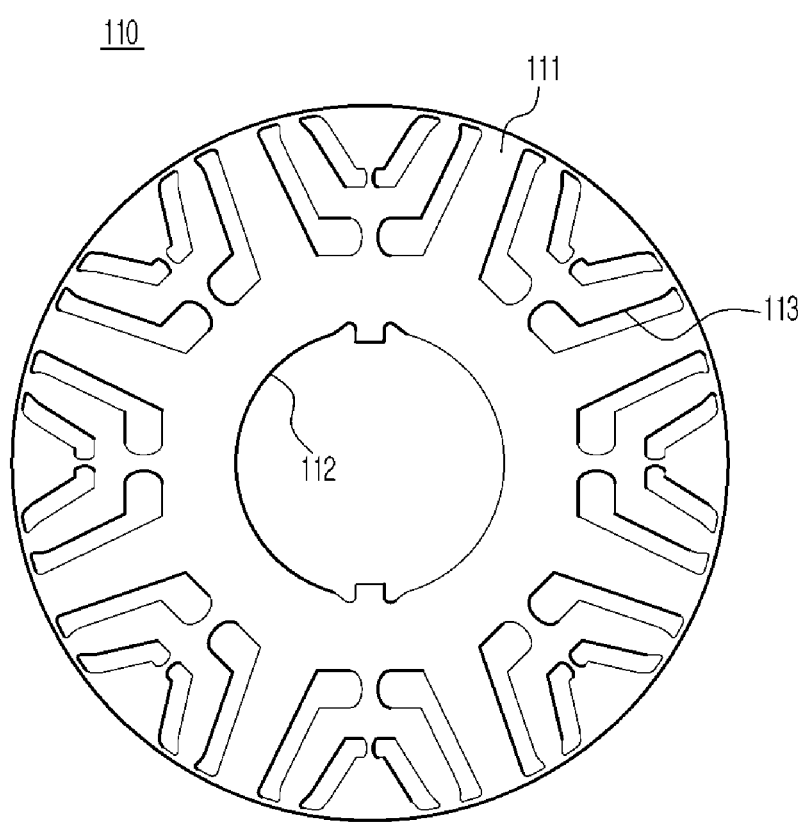
FIG. 3 is a view illustrating a rotor core according to an exemplary embodiment of the present disclosure.

Hereinafter, exemplary embodiments according to the present disclosure will be described in detail with reference to the accompanying drawings. FIG. 1 is view illustrating a rotor of a motor according to an exemplary embodiment, FIG. 2 is a detailed perspective view illustrating the rotor of the motor according to an exemplary embodiment, and FIG. 3 is a view illustrating a rotor core according to an exemplary embodiment. According to exemplary embodiments, a motor is a traction motor, wherein the traction motor includes a stator (not shown) and a rotor rotatably disposed inside the stator.

As illustrated in FIGS. 1 to 3, a rotor 100 may include a rotary shaft 10, a rotor core 110 coupled to the rotary shaft 10 to surround an outer circumferential surface of the rotary shaft 10, a magnet 120 inserted into the rotor core 110 in an axial direction, and a plate 130 coupled to opposite end portion of the rotor core 110.

Particularly, the rotor core 110 may be formed in a cylindrical shape, wherein a plurality of disk-shaped rotor core bodies 111 may be stacked in the axial direction thereof. The rotor core 110 is accommodated in a stator (not show) at a particular air gap. The rotor core body 111 may include a aperture 112 formed in the center of the rotor core body 111 to penetrate in the axial direction to allow the rotor core 10 to be inserted and fixed thereinto, and a plurality of magnet coupling apertures 113 formed along a circumference of the aperture 112. The plurality of the magnet coupling apertures 113 may be provided symmetrically with respect to the axis along the axial direction. Each of the magnets 120 may be inserted into each of the magnet coupling apertures 113.

The magnet coupling aperture 113 may be formed to penetrate in the axial direction of the rotor core 110. The magnet coupling aperture 113 penetrates each of the rotor core body 111 to have a shape in which opposite end portions thereof are open. The magnet 120 may include a permanent magnet 120. Additionally, the magnet 120 may be configured to generate a stable magnetic field without being supplied with electric energy from the outside to rotate the rotor 100. The magnet 120 may be configured to generate a rotational force in the rotor core 110 by an interaction with a magnetic field generated in a coil (not shown) mounted on the stator.

The magnet 120 may include a rectangular parallelepiped magnet body 121. The magnet body 121 may include a first end surface 122 formed at a first end portion, and a second end surface 123 formed at a second end portion. The first end surface 122 and the second end surface 123 may be formed in the same size and shape. The magnet 120 may include four surface portions that connect the first end surface 122 to the second end surface 123. Two of the four surface portions may be formed to face each other.

When a current is applied to the coil, the rotor 100 may be rotated by the interaction between the rotating magnetic field generated by the structure of the stator, and the induced current generated in the conductor. When the rotor 100 reaches the synchronization speed, the torque by the magnet 120 and the reluctance torque caused by the structure of the rotor 100 may be generated and thus, the rotor 100 may be rotated to generate the torque. Further, the plate 130 may be disposed on upper and lower surfaces of the rotor core 110. Since the plate 130 may be disposed at the first end and the second end of the rotor core 110, the plate 130 may maintain a rotational balance of the rotor core 110 constant to prevent vibrations caused by a weight deviation when the rotor core 110 is rotated at a high speed.

In particular, the plate 130 may be formed of a non-magnetic material such as plastic, thereby preventing a magnetic flux leakage generated from the magnet 120. The plate 130 may include a first plate 131 disposed on a first end portion of the rotor core 110, and a second plate 132 disposed on a second end portion of the rotor core 110. The plate 130 may be provided in pairs to support opposite end portions of the rotor core 110. Hereinafter, the first plate 131 and the second plate 132 will be described collectively as the plate 130. The plate 130 may include a magnet support portion 300 configured to support the magnet 120.

Figure 4:
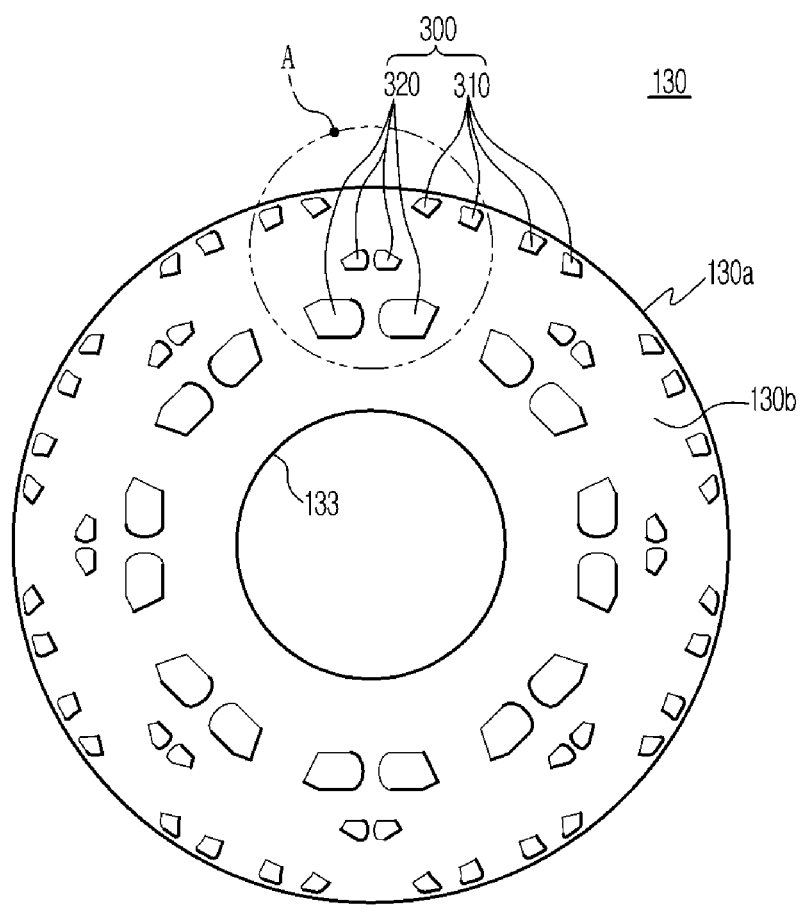
FIG. 4 is a view illustrating a plate of the motor according to an exemplary embodiment of the present disclosure.
Figure 5:
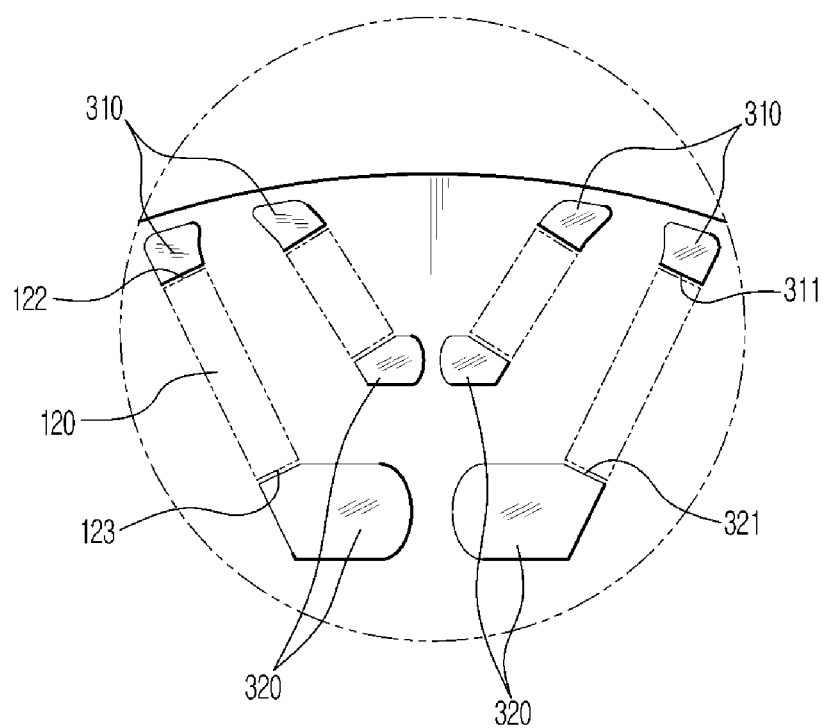
FIG. 5 is a detailed view illustrating a portion A of FIG. 4, particularly illustrating a position fixing portion of the plate according to an exemplary embodiment of the present disclosure.
Figure 6:
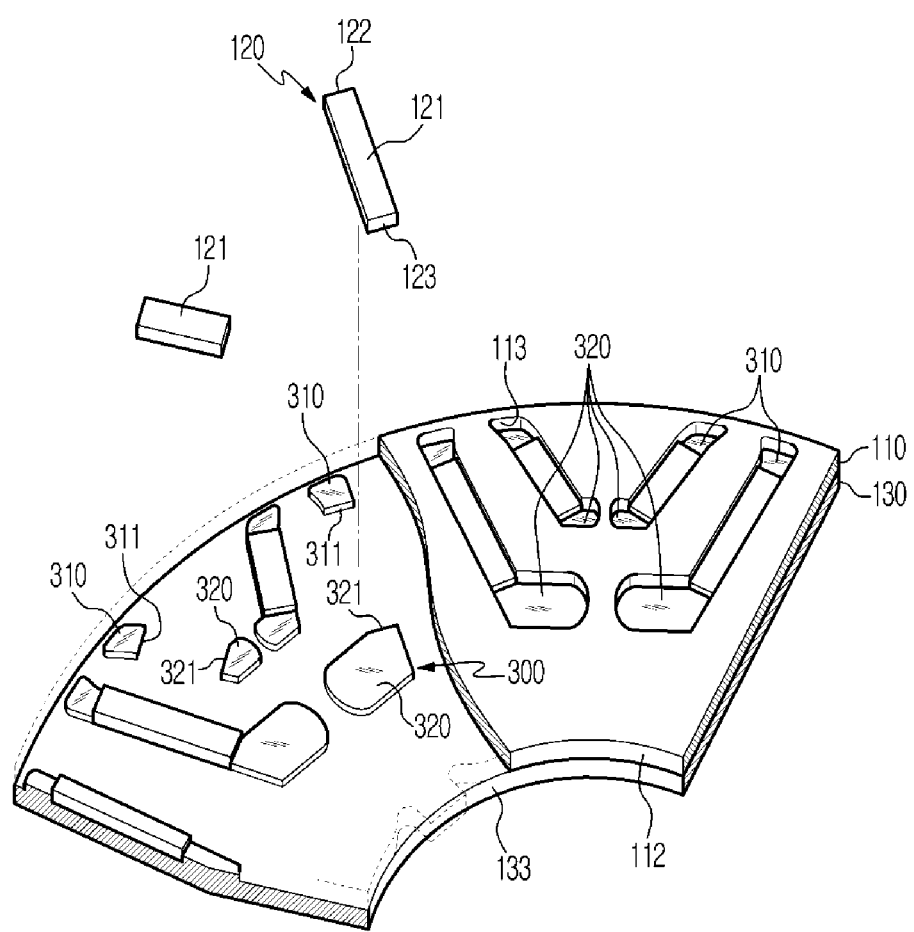
FIG. 6 is a view illustrating coupling of the plate and the rotor core according to an exemplary embodiment of the present disclosure.

FIG. 4 is a view illustrating a plate of the motor according to an exemplary embodiment, FIG. 5 is a detailed view illustrating a portion A of FIG. 4, particularly illustrating a position fixing portion of the plate according to an exemplary embodiment, and FIG. 6 is a view illustrating coupling of the plate and the rotor core according to an exemplary embodiment.

As illustrated in FIGS. 4 to 6, the plate 130 may include a disc-shaped plate body 130a. In the center of the plate body 130a, a shaft aperture 133 may be provided to allow the rotor core 10 to be inserted thereinto. The shaft aperture 133 may be formed to have a shape and disposed in a position by aligning to the aperture 112 of the rotor core 110.

The plate 130 may include a magnet support portion 300 that protrudes from a bottom surface 130*b*. The magnet support portion 300 may protrude from the bottom surface 130*b* of the plate 130 and thus, the magnet support portion 300 may be coupled between the rotor core 110 and the magnet 120. The magnet support portion 300 may have a shape that corresponds to the magnet coupling aperture 113 of the rotor core 110. The magnet support portion 300 may be disposed to correspond to the magnet coupling aperture 113 which is formed to be open at opposite end portions of the rotor core 110. The magnet support portion 300 may be formed in a shape that corresponds to at least one portion of the magnet coupling aperture 113 of the rotor core 110. The magnet support portion 300 may include a first support portion 310 disposed to correspond to a first side of the magnet coupling aperture 113 of the rotor core 110 and a second support portion 320 disposed to correspond to a second side of the magnet coupling aperture 113.

The first support 310 may be configured to support the first end surface 122 and the second support portion 320 may be configured to support the second end surface 123. The first end surface 122 of the magnet 120 may be disposed further towards the outside than the second end surface 123 with respect to the center of the rotor core 110 (e.g., further from the center of the rotor core 110). At least one portion of the first support portion 310 is in contact with the first end surface 122 of the magnet 120. Additionally, at least one portion of the first support portion 310 may include a first support surface 311 in contact with the first end surface 122 of the magnet 120. At least one portion of the second support portion 320 may be in contact with the second end surface 123 of the magnet 120. At least one portion of the second support portion 320 may include a second support surface 321 in contact with the second end surface 123 of the magnet 120. The first support portion 310 may be disposed further towards the outside than the second support portion 320 with respect to the center of the plate 130.

The first support portion 310 and the second support portion 320 of the magnet support portion 300 supported by the first side and the second side of the magnet 120, respectively, may be accommodated in the magnet coupling aperture 113 of the rotor core 110. Therefore, since the magnet support portion 300 of the plate 130 may be coupled between the magnet coupling aperture 113 of the rotor core 110, the magnet support portion 300 may allow the magnet 120 to be disposed or arranged in a more accurate position and support and fix the magnet 120 without an additional structure. Accordingly, since the magnet 120 may be fixed by the magnet support portion 300 of the plate 130, it may be possible to prevent the magnetic flux leakage.

Figure 7:
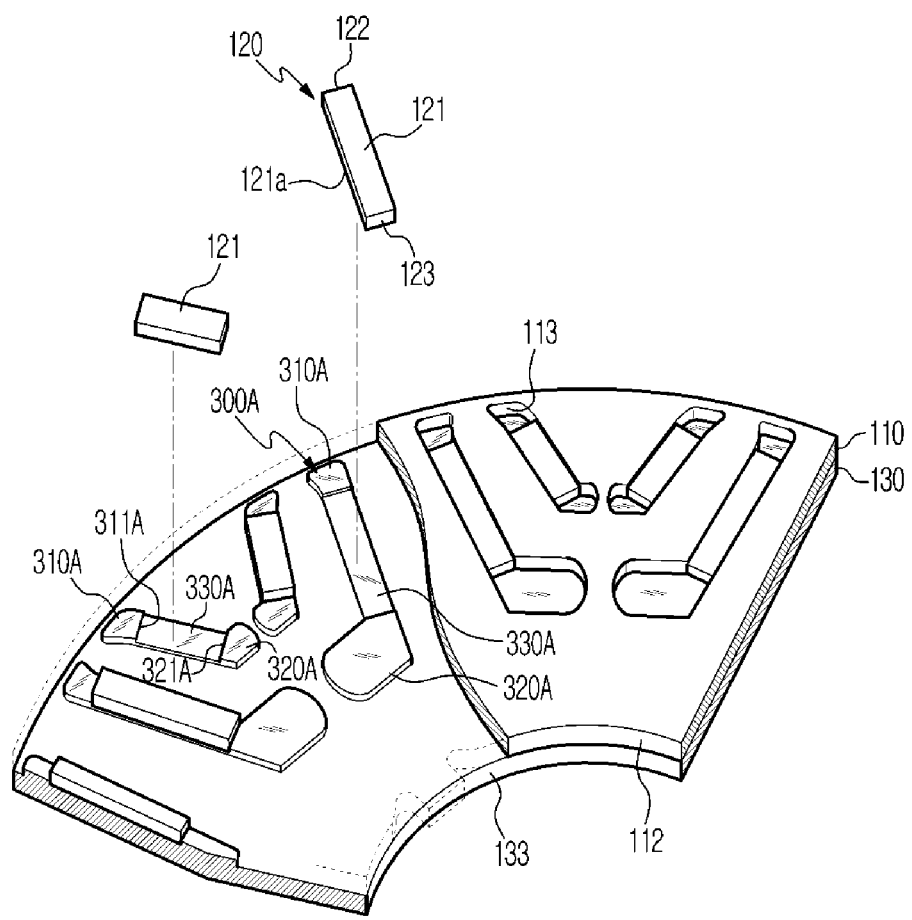
FIG. 7 is a view illustrating a coupling state of a plate and a rotor core according to another exemplary embodiment of the present disclosure.

FIG. 7 is a view illustrating a coupling state of a plate and a rotor core according to another exemplary embodiment. Reference numerals, which are not shown, refer to FIGS. 1 to 6. A plate 130 may include a magnet support portion 300A that protrudes from a bottom surface 130*b*. The magnet support portion 300A may protrude from the bottom surface 130*b* of the plate 130 and then be coupled between a rotor core 110 and a magnet 120. The magnet support portion 300A may be formed in a shape that corresponds to a magnet coupling aperture 113 of the rotor core 110.

Furthermore, the magnet support portion 300A may be disposed to correspond to the magnet coupling aperture 113 which is formed to be open at opposite end portions of the rotor core 110. The magnet support portion 300A may be formed in a shape that corresponds to at least one portion of the magnet coupling aperture 113 of the rotor core 110. The magnet support portion 300A may include a first support portion 310A disposed to correspond to a first side of the magnet coupling aperture 113 of the rotor core 110, a second support portion 320A disposed to correspond to a second side of the magnet coupling aperture 113, and a third support portion 330A configured to connect the first support portion 310A to the second support portion 320A. The first support 310A may be configured to support the first end surface 122, and the second support portion 320A may be configured to support the second end surface 123. The third support portion 330A may be provided to support a bottom surface 121*a* among four side surface of the magnet 120.

The first end surface 122 of the magnet 120 may be disposed further towards the outside than the second end surface 123 with respect to the center of the rotor core 110. At least one portion of the first support portion 310A may be in contact with the first end surface 122 of the magnet 120. At least one portion of the first support portion 310A may include a first support surface 311A in contact with the first end surface 122 of the magnet 120. At least one portion of the second support portion 320A may be in contact with the second end surface 123 of the magnet 120. Additionally, at least one portion of the second support portion 320A may include a second support surface 321A in contact with the second end surface 123 of the magnet 120.

The first support portion 310A may be disposed further towards the outside than the second support portion 320A with respect to the center of the plate 130. The first support portion 310A and the second support portion 320A of the magnet support portion 300A supported by the first side and the second side of the magnet 120, respectively, may be accommodated in the magnet coupling aperture 113 of the rotor core 110.

Therefore, since the magnet support portion 300A of the plate 130 may be coupled to between the magnet coupling aperture 113 of the rotor core 110, the magnet support portion 300A may allow the magnet 120 to be disposed in a more accurate position and support and fix the magnet 120 without an additional structure. Accordingly, since the magnet 120 may be fixed by the magnet support portion 300A of the plate 130, it may be possible to prevent the magnetic flux leakage.

Figure 8:
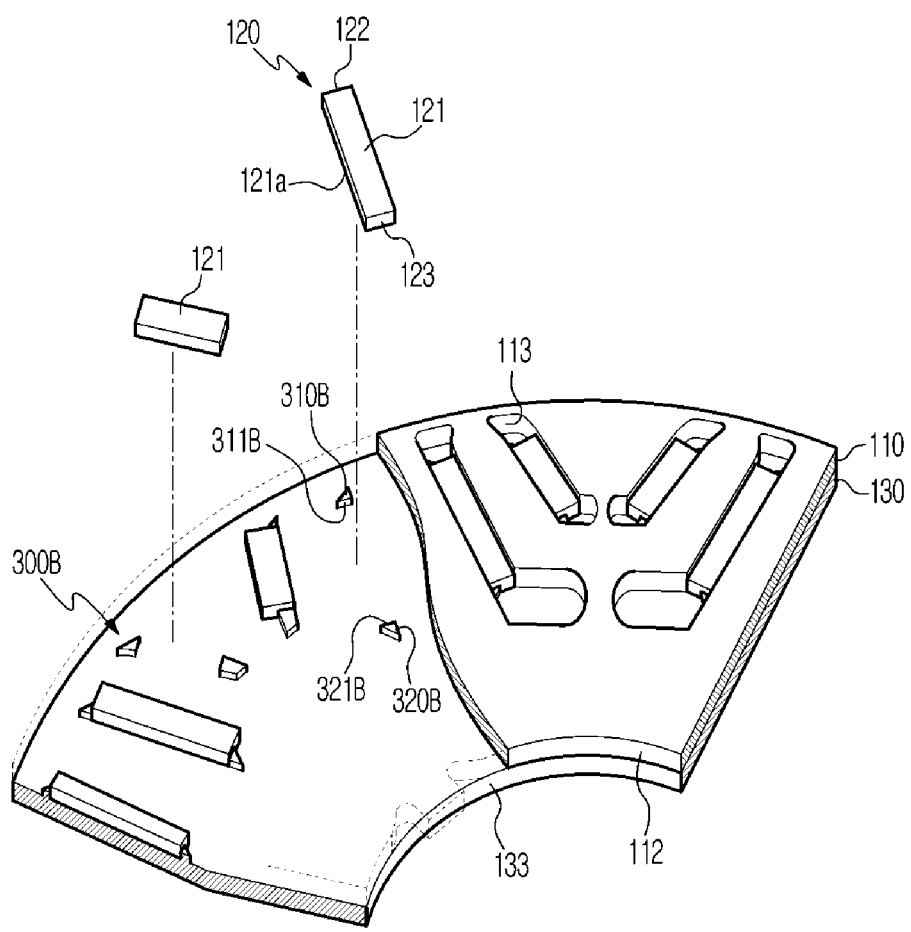
FIG. 8 is a view illustrating a coupling state of a plate and a rotor core according to another exemplary embodiment of the present disclosure.

FIG. 8 is a view illustrating a coupling state of a plate and a rotor core according to another exemplary embodiment. Reference numerals, which are not shown, refer to FIGS. 1 to 6. A plate 130 may include a magnet support portion 300B that protrudes from a bottom surface 130*b*. The magnet support portion 300B may protrude from the bottom surface 130*b* of the plate 130 and then be coupled between a rotor core 110 and a magnet 120. The magnet support portion 300B may be formed in a shape that corresponds to a magnet coupling aperture 113 of the rotor core 110.

The magnet support portion 300B may be disposed to correspond to the magnet coupling aperture 113 which is formed to be open at opposite end portions of the rotor core 110. The magnet support portion 300B may include a first support portion 310B disposed to correspond to a first side of the magnet coupling aperture 113 of the rotor core 110, and a second support portion 320B disposed to correspond to a second side of the magnet coupling aperture 113. The first support 310B may be configured to support the first end surface 122 of the magnet 120.

The first end surface 122 of the magnet 120 may be disposed further towards the outside than the second end surface 123 with respect to the center of the rotor core 110. At least one portion of the first support portion 310B may be in contact with the first end surface 122 of the magnet 120. At least one portion of the first support portion 310B may include a first support surface 311B in contact with the first end surface 122 of the magnet 120. Further, at least one portion of the second support portion 320B may be in contact with the second end surface 123 of the magnet 120. At least one portion of the second support portion 320B may include a second support surface 321B in contact with the second end surface 123 of the magnet 120.

The first support portion 310B may be disposed further towards the outside than the second support portion 320B with respect to the center of the plate 130. The first support portion 310B and the second support portion 320B of the magnet support portion 300B supported by a first side and a second side of the magnet 120, respectively, may be accommodated in the magnet coupling aperture 113 of the rotor core 110.

Therefore, since the magnet support portion 300B of the plate 130 may be coupled to between the magnet coupling aperture 113 of the rotor core 110, the magnet support portion 300B may allow the magnet 120 to be disposed in a more accurate position and support and fix the magnet 120 without an additional structure. Accordingly, since the magnet 120 may be fixed by the magnet support portion 300B of the plate 130, it may be possible to prevent the magnetic flux leakage.

A manufacturing method of a rotor of a motor having a structure for supporting and fixing magnets by a plate according to another exemplary embodiment will be described as follows. A rotor core 110 in which a plurality of magnet coupling apertures 113 is formed may be stacked, and a magnet 120 may be disposed in the plurality of magnet coupling apertures 113 using a jig (not shown) from which a magnet support portion 300 protrudes. The magnet 120 and the rotor core may be molded, the jig may be removed, and the plate 130 may be assembled.

As mentioned above, as for the manufacturing method according to another exemplary embodiment, an additional structure for fixing the magnet is not required and the magnet may be disposed or arranged in a more accurate position by the plate formed of non-magnetic material. Accordingly, it may be possible to prevent the magnetic flux leakage generated from the magnet. As is apparent from the above description, it may be possible to improve the assembling structure of the rotor core and the magnet to fix the magnet in the correct position, thereby improving the performance of the motor. It may further be possible to increase the counter-electromotive voltage by preventing the magnetic flux leakage of the rotor and thus, it may be possible to increase the maximum torque and to reduce the need current required for generating the same torque.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

DESCRIPTION OF REFERENCE NUMERALS

10: rotary shaft
100: rotor
110: rotor core
120: magnet
130: plate
300: magnet support portion
310: first support portion
311: first support surface
320: second support portion
321: second support surface
330: third support portion

What is claimed is:

1. A motor, comprising:
   a stator; and
   a rotor configured to rotate with respect to the stator,
   wherein the rotor includes:
   a rotor core disposed rotatably with respect to a rotary shaft and having a plurality of magnet coupling apertures disposed apart from each other at a particular interval in a circumferential direction of the rotary shaft;
   a magnet inserted into the magnet coupling aperture; and
   a plate coupled to opposite end portions of the rotor core,
   wherein the plate includes a magnet support portion configured to support the magnet,
   wherein the magnet support portion protrudes from a bottom surface of the plate,
   wherein the magnet support portion protrudes from the plate to be coupled between the rotor core and the magnet,
   wherein the magnet support portion is disposed to correspond to at least one portion of the magnet coupling aperture, and
   wherein the magnet support portion includes:
   a first support portion disposed to correspond to a first side of the magnet coupling aperture and configured to support a first end surface of the magnet; and
   a second support portion disposed to correspond to a second side of the magnet coupling aperture and configured to support a second end surface opposite to the first end surface.

2. The motor of claim 1, wherein the magnet support portion is formed to have a shape that corresponds to at least one portion of the magnet coupling aperture.

3. The motor of claim 1, wherein the first support portion is disposed further towards an outside than the second support portion with respect to a center of the plate.

4. The motor of claim 1, wherein the first support portion includes a first support surface in contact with the first end surface and the second support portion includes a second support surface in contact with the second end surface.

5. The motor of claim 1, wherein the first support portion and the second support portion are accommodated inside of the magnet coupling aperture.

6. The motor of claim 1, wherein a center of the plate includes a shaft aperture to allow the rotary shaft to be inserted therein.

7. The motor of claim 6, wherein the shaft aperture is disposed in a position that corresponds to an aperture of the rotor core.

8. A method for manufacturing a rotor, comprising:
   stacking a rotor core in which a plurality of magnet coupling apertures are disposed;
   disposing a magnet in the plurality of magnet coupling apertures using a jig from which a magnet support portion protrudes;
   molding the magnet and the rotor core; and
   removing the jig and assembling the plate,
   wherein the magnet support portion protrudes from a bottom surface of the plate,
   wherein the magnet support portion protrudes from the plate to be coupled between the rotor core and the magnet, wherein the magnet support portion is disposed to correspond to at least one portion of the magnet coupling aperture, and wherein the magnet support portion includes:

a first support portion disposed to correspond to a first side of the magnet coupling aperture and configured to support a first end surface of the magnet; and a second support portion disposed to correspond to a second side of the magnet coupling aperture and configured to support a second end surface opposite to the first end surface.

* * * * *